(12) United States Patent
Arguez et al.

(10) Patent No.: US 12,070,987 B2
(45) Date of Patent: Aug. 27, 2024

(54) METHOD AND SYSTEM FOR REGULATING COMFORT IN A VEHICLE PASSENGER COMPARTMENT

(71) Applicant: FAURECIA INTERIEUR INDUSTRIE, Nanterre (FR)

(72) Inventors: Safa Arguez, Souhil Nabeul (TN); Benjamin Herout, Chantilly (FR); Eduin Le Nain, Juziers (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 26 days.

(21) Appl. No.: 17/860,608

(22) Filed: Jul. 8, 2022

(65) Prior Publication Data
US 2023/0011191 A1  Jan. 12, 2023

(30) Foreign Application Priority Data
Jul. 9, 2021 (FR) .................................. 21 07463

(51) Int. Cl.
*B60H 1/00* (2006.01)
*B60H 1/22* (2006.01)

(52) U.S. Cl.
CPC ....... *B60H 1/00742* (2013.01); *B60H 1/2227* (2019.05); *B60H 1/00285* (2013.01); *B60H 2001/224* (2013.01)

(58) Field of Classification Search
CPC .............. B60H 1/00742; B60H 1/2227; B60H 1/00285; B60H 1/2218; B60H 2001/224
See application file for complete search history.

(56) References Cited

U.S. PATENT DOCUMENTS

| 8,884,191 B2 | 11/2014 | Ogino |
| 10,393,595 B2 * | 8/2019 | Kakade ............ B60H 1/00807 |

(Continued)

FOREIGN PATENT DOCUMENTS

| JP | 2000247128 A | 9/2000 |
| JP | 2012158226 A | 8/2012 |

(Continued)

OTHER PUBLICATIONS

French Search Report corresponding to French Application No. FR2107463, dated Mar. 25, 2022, 9 pages.

*Primary Examiner* — Marc E Norman
(74) *Attorney, Agent, or Firm* — Reising Ethington P.C.

(57) ABSTRACT

A method for regulating comfort in a passenger compartment of a vehicle, the passenger compartment including a seat, a radiant panel, and a heating device for the seat; the method being implemented by a controller having a memory containing a pre-established map. The method includes the following steps: acquiring a data item that is characteristic of the state of the passenger compartment, the characteristic data item including the temperature of the passenger compartment; determining, from the map, an optimal comfort level as a function of the characteristic data item; reading, in the map, regulation values associated with the optimal comfort level, the regulation values including values representative of the operating power of the radiant panel and of the heating device for the seat; and transmitting the read regulation values to the radiant panel and to the heating device.

15 Claims, 5 Drawing Sheets

(56) References Cited

U.S. PATENT DOCUMENTS

| | | | |
|---|---|---|---|
| 2013/0068440 A1* | 3/2013 | Kamiyama | B60H 1/00849 |
| | | | 165/202 |
| 2017/0080779 A1 | 3/2017 | Sagou et al. | |
| 2020/0406708 A1 | 12/2020 | Yokota et al. | |
| 2021/0008960 A1 | 1/2021 | Saitou et al. | |
| 2021/0094388 A1* | 4/2021 | Kakade | F28F 27/00 |
| 2022/0088999 A1* | 3/2022 | Hoshino | B60H 1/3208 |
| 2023/0036016 A1* | 2/2023 | Jovovic | B60H 1/2218 |

FOREIGN PATENT DOCUMENTS

| | | |
|---|---|---|
| KR | 100727352 B1 | 6/2007 |
| WO | 2021005617 A1 | 1/2021 |
| WO | 2021102450 A1 | 5/2021 |

* cited by examiner

METHOD AND SYSTEM FOR REGULATING COMFORT IN A VEHICLE PASSENGER COMPARTMENT

TECHNICAL FIELD

This invention relates to a method and a system for regulating comfort in the passenger compartment of a vehicle, in particular of a motor vehicle. More specifically, the invention relates to a method and a system for regulating the comfort of thermal comfort. The invention also relates to a computer program product.

BACKGROUND

There are many existing systems for regulating comfort in a passenger compartment. However, few drivers or occupants are satisfied with the regulation system implemented in their motor vehicle.

A first object of this invention is to provide a regulation method and system which improve the situation.

A second object of this invention is to propose a regulation method and system which take better account of what the occupants are feeling.

A third object of this invention is to propose a regulation method and system which adapt to the needs and specific characteristics of each person.

SUMMARY

One object of this invention is a method for regulating comfort in a passenger compartment of a vehicle, in particular of a motor vehicle, the passenger compartment comprising at least one seat as well as comfort devices; the method being implemented by a controller comprising a memory containing a pre-established map, the controller being connected to said comfort devices; the comfort devices comprising at least one radiant panel and at least one heating device for the seat, the method comprising the following steps:
  acquiring at least one data item that is characteristic of the state of the passenger compartment, the at least one characteristic data item comprising the temperature of the passenger compartment;
  determining, from the map, an optimal comfort level as a function of the at least one characteristic data item;
  reading, in the map, regulation values associated with the optimal comfort level, said regulation values comprising values representative of the operating power of the comfort devices;
  transmitting the read regulation values to the comfort devices.

The features set forth in the following paragraphs may optionally be implemented. They may be implemented independently of each other or in combination with each other:
  the map comprises an optimal comfort level associated with at least one characteristic data item and with regulation values for the comfort devices;
  the acquisition step comprises the acquisition of several characteristic data items concerning the state of the passenger compartment, said characteristic data items comprising at least one data item among: a data item representative of the sunlight in the passenger compartment, a data item representative of the ventilation in the passenger compartment, a data item representative of the humidity in the passenger compartment, and a data item representative of the temperature of the seats.

when the map comprises several regulation values associated with the at least one characteristic data item and with an optimal comfort level for a comfort device, the method further comprises a step of selecting the regulation value which allows reducing the electrical consumption of said comfort device;

the comfort devices further comprise at least one ventilation system for the seat, and when the map comprises several regulation values associated with an optimal comfort level and with at least one characteristic data item, the method further comprises a step of selecting the regulation value which allows reducing the noise generated by the at least one ventilation system for the seat;

the method comprises a preliminary characterization phase during which the map is established by experimentation, the characterization phase comprising the following steps:
  varying the characteristic data items and the regulation values and measuring the corresponding operating temperatures,
  determining comfort indices as a function of the measured operating temperatures and storing in the map the comfort indices associated with each characteristic data item and with each regulation value of each device,
  defining the optimal comfort level as a function of the comfort indices;

the comfort index varies between −3 and +3, and the comfort index is a function of the operating temperatures, for example according to the following relations:
  when the operating temperature is below 21° C., PMV=A×Top−B, where A is between 0.15 and 0.25 and B is between 3.15 and 4.25;
  when the operating temperature is between 21° C. and 27° C., the comfort index is between 0.5 and 1,
  when the operating temperature is above 27° C., PMV=A×Top−B, where A is between 0.3 and 0.4 and B is between 7.6 and 9.3,
  where PMV is the comfort index and Top is the measured operating temperature.

the comfort indices are further determined based on the heat conductions of the at least one seat;

the comfort index varies between −3 and +3, and the comfort index is a function of the operating temperatures and of the heat transfer by conduction to which an occupant of the seat is subjected, for example according to the following relations:
  when the operating temperature is below 21° C., PMV= (A×Top−B)+(0.303×e$^{-0.036 \times M}$+0.028)×cond where A is between 0.15 and 0.25 and B is between 3.15 and 4.25;
  when the operating temperature is between 21° C. and 27° C., the comfort index is substantially equal to 0.7+(0.303×e$^{-0.036}$×m+0.028)×cond,
  when the operating temperature is above 27° C., PMV= (A×Top−B)+(0.303×e$^{-0.036 \times M}$+0.028)×cond where A is between 0.30 and 0.4 and B is between 7.6 and 9.3,
  where PMV is the comfort index, Top is the measured operating temperature, cond is the heat conduction of the seat, and M is the average metabolic rate of an occupant of the seat.

the optimal comfort level is defined by a comfort index between 0 and 0.7 and preferably equal to 0.

the passenger compartment comprises a human-machine interface connected to the controller, the method further comprising the following steps:
  receiving a comfort adjustment instruction via the human-machine interface,
  modifying the optimal comfort level according to the adjustment instruction received,
  reading, in the map, regulation values associated with the modified optimal comfort level and returning to the transmission step;
the method further comprises the following steps:
  receiving the identification of an occupant of the seat,
  storing the identification of the occupant of the seat, linked to the modified optimal comfort level, and
  upon subsequently receiving an identification of the occupant of the seat corresponding to the stored identification, using the modified optimal comfort level;
the passenger compartment comprises several seats and the memory contains several maps, each map having been established by experimental measurements carried out for a seat.

The invention also relates to a system for regulating comfort in a passenger compartment of a vehicle, in particular of a motor vehicle, the system comprising comfort devices and a controller connected to the comfort devices, the controller comprising a memory containing a pre-established map; the comfort devices comprising at least one radiant panel and at least one heating device for a seat, the controller being configured to implement the method mentioned above.

Finally, the invention relates to a computer program product comprising program code instructions stored on a computer medium, the program code instructions making it possible to implement the method mentioned above when they are executed by a processor.

DETAILED DESCRIPTION

By convention, in this patent application the term "PMV comfort indices" refers to the Predicted Mean Vote indices. These indices express the heat felt by a person. They are generally called PMV index. These indices reflect the average value of the votes of a large group of people on a scale of thermal sensation ranging from +3 to −3. These PMV indices have the following meanings:
  +3 means "very hot";
  +2 means "hot";
  +1 means "slightly warm"
  0 means "neither hot nor cold",
  −1 means "slightly cold",
  −2 means "cold",
  −3 means "very cold".

Figure 1:
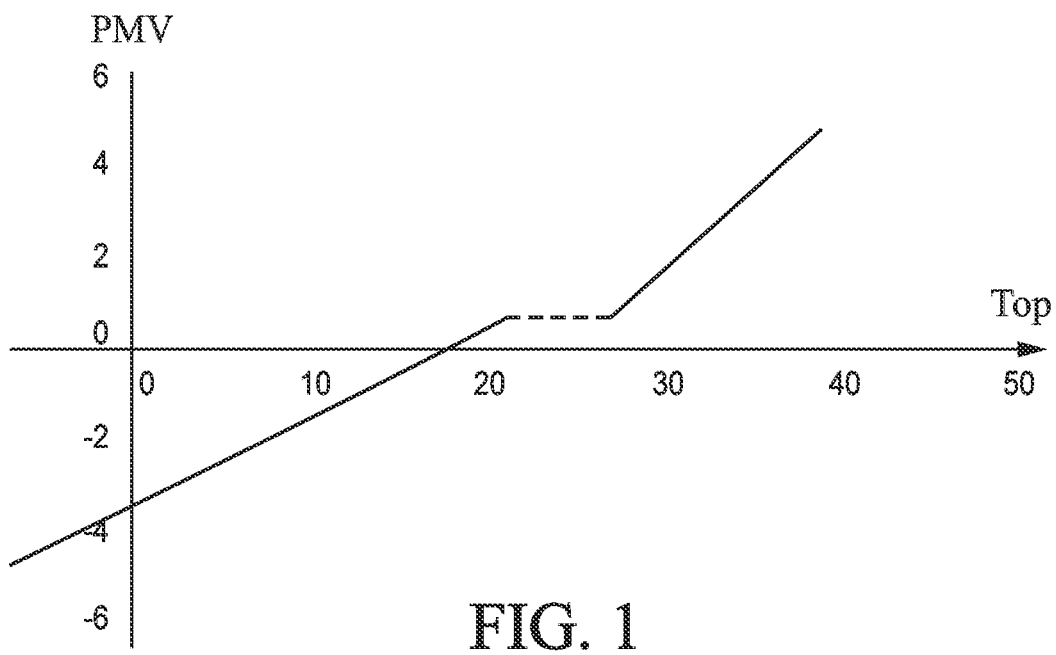
FIG. 1 is a graph representing the comfort indices as a function of the operating temperatures.

With reference to FIG. 1, the inventors have been able to observe that when only radiative and convective exchanges in the passenger compartment are taken into account, the PMV comfort indices vary according to the operating temperatures Top, in particular according to the following relations:
  when the operating temperature Top is below 21° C., PMV=A×Top−B(1) where A is between 0.15 and 0.25 and B is between 3.15 and 4.25;
  when the operating temperature Top is between 21° C. and 27° C., the PMV comfort index is between 0.5 and 1 (2);
  when the operating temperature is above 27° C., PMV=A×Top−B (3) where A is between 0.3 and 0.4 and B is between 7.6 and 9.3;
  where PMV is the comfort index and Top is the operating temperature Top measured for example using a black globe.

The inventors have also been able to observe that when the radiative, conductive, and convective exchanges within the passenger compartment are taken into account, the PMV comfort indices vary according to the operating temperatures Top, the heat conduction of the seat, and the average metabolic rate of an occupant of the seat, in particular according to the following relations:
  when the operating temperature Top is below 21° C., PMV=(A×Top−B)+(0.303×$e^{-0.036 \times M}$+0.028)×cond (4) where A is between 0.15 and 0.25 and B is between 3.15 and 4.25;
  when the operating temperature Top is between 21° C. and 27° C., the PMV comfort index is substantially equal to 0.7+(0.303×$e^{-0.036}$×m+0.028)×cond (5),
  when the operating temperature is above 27° C., PMV= (A×Top−B)+(0.303×$e^{-0.036 \times m}$+0.028)×cond (6) where A is between 0.3 and 0.4 and B is between 7.6 and 9.3,
  where PMV is the comfort index, Top is the measured operating temperature, cond is the heat conduction of the seat, and M is the average metabolic rate of an occupant of the seat. For example, the average metabolic rate M for driving is 80 W/m².

These relations (4) to (6) were established using a black globe and a flow meter and the ISO 7730 standards.

Finally, the inventors were able to observe that when the passengers are feeling a pleasant level of heat, the PMV comfort index is between 0 and 0.7 and is preferably equal to 0.

Figure 2:
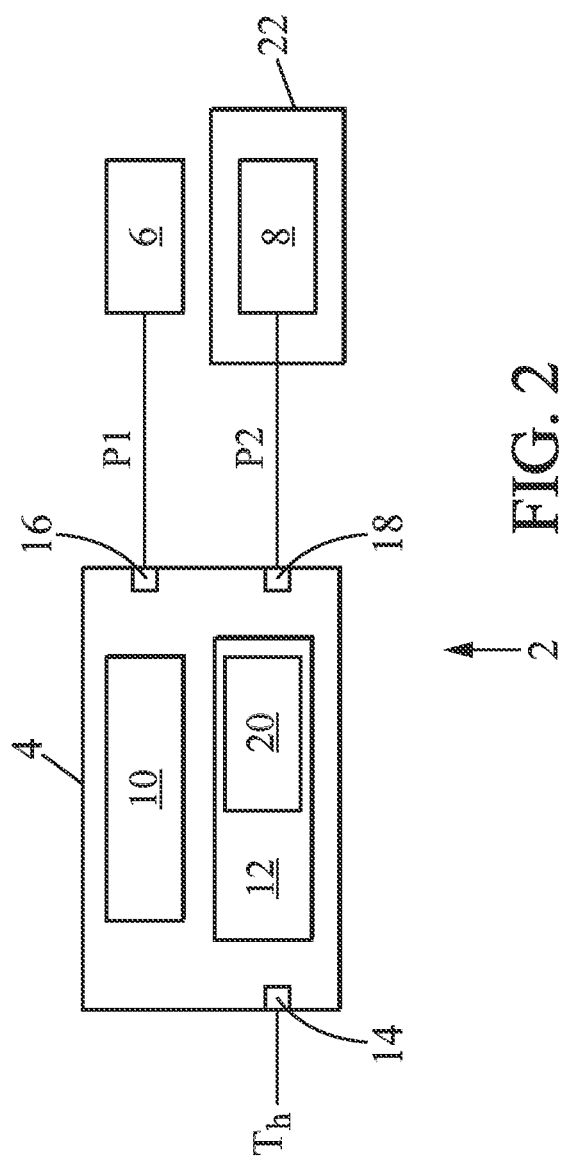
FIG. 2 is a schematic view of a regulation system according to a first embodiment of the invention.

Referring to FIG. 2, the system 2 for regulating a passenger compartment of a vehicle according to the first embodiment of the invention comprises a controller 4 and comfort devices 6, 8 connected to the controller.

The comfort devices comprise a radiant panel 6, for example mounted within a trim element such as a door panel, a dashboard, or a center console, and a seat heating device 8 mounted on a seat 22.

The controller 4 comprises a processor 10, a memory 12, one or more inputs 14 and outputs 16, 18. The memory 12 contains a map 20 pre-established during a preliminary characterization phase explained below.

According to the invention, for regulating comfort in the passenger compartment of a vehicle, the map 20 associates PMV comfort indices with characteristic data items for the passenger compartment, such as the temperature Th, and with regulation values P1, P2 for the comfort devices 6,8.

In the embodiment represented in FIG. 2, the characteristic data items of the passenger compartment consist of temperatures Th of the passenger compartment.

The characteristic data items of the passenger compartment may also comprise, in addition to other data among the representative data items, the sunlight E in the passenger compartment, data representative of the ventilation V in the passenger compartment, data representative of the humidity H in the passenger compartment, data representative of the temperature Ts of the seats, an outside temperature, and a duration since the trip began.

The regulation values P1, P2 for the comfort devices are values representative of the operating powers of the comfort devices, in particular electrical power.

Figure 3:
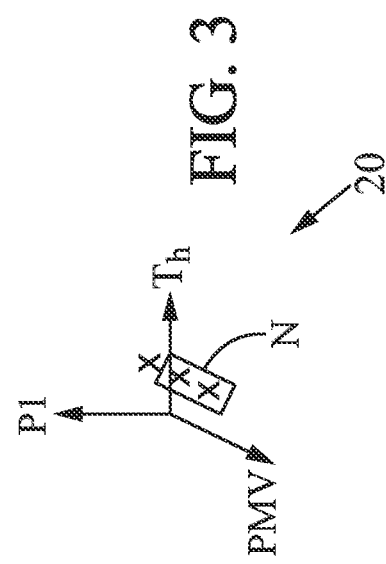
FIG. 3 is a simplified schematic view of a map of the regulation system according to the first embodiment of the invention.

FIG. 3 shows an example of a simplified map associating PMV comfort indices with temperatures Th of the passenger compartment and with regulation values P1 for the radiant panel 6.

The map 20 further defines an optimal comfort level N as having a comfort index between 0 and 0.7. Preferably, the optimal comfort level N corresponds to a PMV comfort level equal to 0. In the case where, for given characteristics of the passenger compartment, no regulation value P1, P2 allows reaching a comfort index between 0 and 0.7, the optimal comfort level defined is the one which has a comfort index closest to the 0 to 0.7 range, and in particular the closest to 0.

The input 14 of the controller is configured to receive characteristic data items of the passenger compartment coming from sensors of any type arranged in the vehicle or coming from an electronic control unit (ECU) or from a climate control system.

In the embodiment represented in FIG. 1, the input 14 only receives the temperature Th of the passenger compartment. The controller outputs 16, 18 are connected to the radiant panel 6 and to the seat heating device 8.

According to an embodiment not shown, the regulation system 2 comprises, for each seat 22 at the front of the vehicle, a radiant panel located in the lower and side portion of the center console and/or a radiant panel located in the door and/or a radiant panel supported by the dashboard and/or a seat heating device composed for example of a heating mat fixed to the seat 22, in particular by a heating mat located on the seating portion and a heating mat located on the backrest.

According to an embodiment not shown, the memory 12 comprises several maps 20, each map having been established by experimental measurements carried out for each seat of the passenger compartment.

Figure 4:
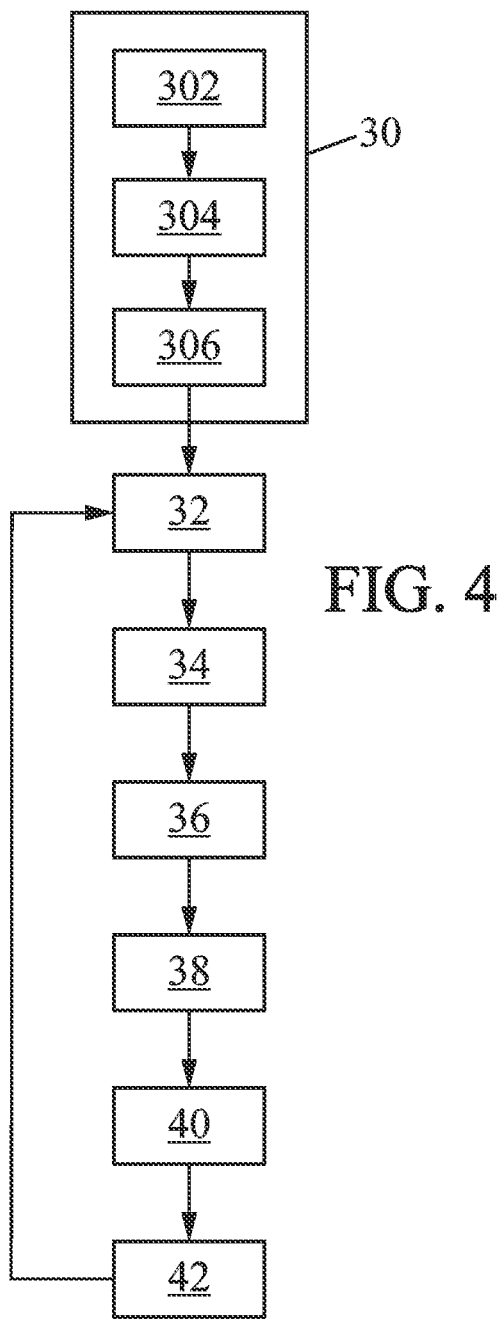
FIG. 4 is a diagram representing the steps of a method according to a first embodiment of the invention.

With reference to FIG. 4, the method for regulating comfort according to the first embodiment begins with a preliminary phase 30 of characterization and establishment of the map 20. This map is established by experimentation.

The preliminary phase 30 comprises a step 302 during which the characteristic data items Th, V, H, Ts, E, ambient temperature, and duration are varied in turn, then the regulation values P1, P2 of each comfort device and the corresponding operating temperatures Top are measured for each case. The operating temperatures may be measured using a black globe.

During a step 304, PMV comfort indices are determined as a function of the measured operating temperatures Top, using relations (1) to (3). Then, the PMV comfort indices are stored in the map 20, linked to or associated with the characteristic data items and the regulation values for each device.

During a step 306, optimal comfort levels N are defined as a function of the PMV comfort indices.

In the example illustrated in FIG. 1 in which the characteristic data items of the comfort passenger compartment include different temperatures of the passenger compartment, and in which the comfort devices comprise a radiant panel 6 and a seat heating device 8, operators measure the operating temperature Top for different temperatures of the passenger compartment, for example for 10° C., 15° C., and 20° C., for different electrical power values P1 of the radiant panel 6 and for different electrical power values P2 of the seat heating device 8. Then, the corresponding PMV comfort indices are determined as a function of the measured operating temperatures, using relations (1) to (3). Finally, the PMV comfort indices are stored in the map 20, linked to the temperatures of the passenger compartment 10° C., 15° C., and 20° C., to the electrical power values P1 for the radiant panel, and to the electrical power values P2 for the seat heating device. The optimal comfort levels N are then defined.

Alternatively, the operating temperature Top and the conductive exchange cond are measured for different characteristic data items of the passenger compartment and for different regulation values for the comfort devices. The conductive heat exchange of the seat may for example be measured using a flow meter.

The PMV comfort indices associated with the characteristic data items and with the regulation values are deduced from this by using relations (4) to (6). The optimal comfort levels N are then defined.

When the preliminary characterization phase 30 is completed, the method begins during a step 32 in which the temperature of the passenger compartment is acquired, as well as any other characteristics.

During a step 34, an optimal comfort level N is determined in the map 20 as a function of the acquired temperature.

During a step 36, the processor reads in the map, for each comfort device, the regulation value(s) associated with the optimal comfort level N.

During a step 38, the processor searches whether for a given comfort device, there are several regulation values associated with the optimal comfort level N.

If such is the case, the processor selects the regulation value which allows decreasing the electrical consumption of this comfort device, during a step 40.

During a step 42, the processor transmits to the seat heating device 6 and to the radiant panel 8 the regulation values read in the map 20, and where appropriate the selected values.

The method then returns to the acquisition step 32.

Figure 5:
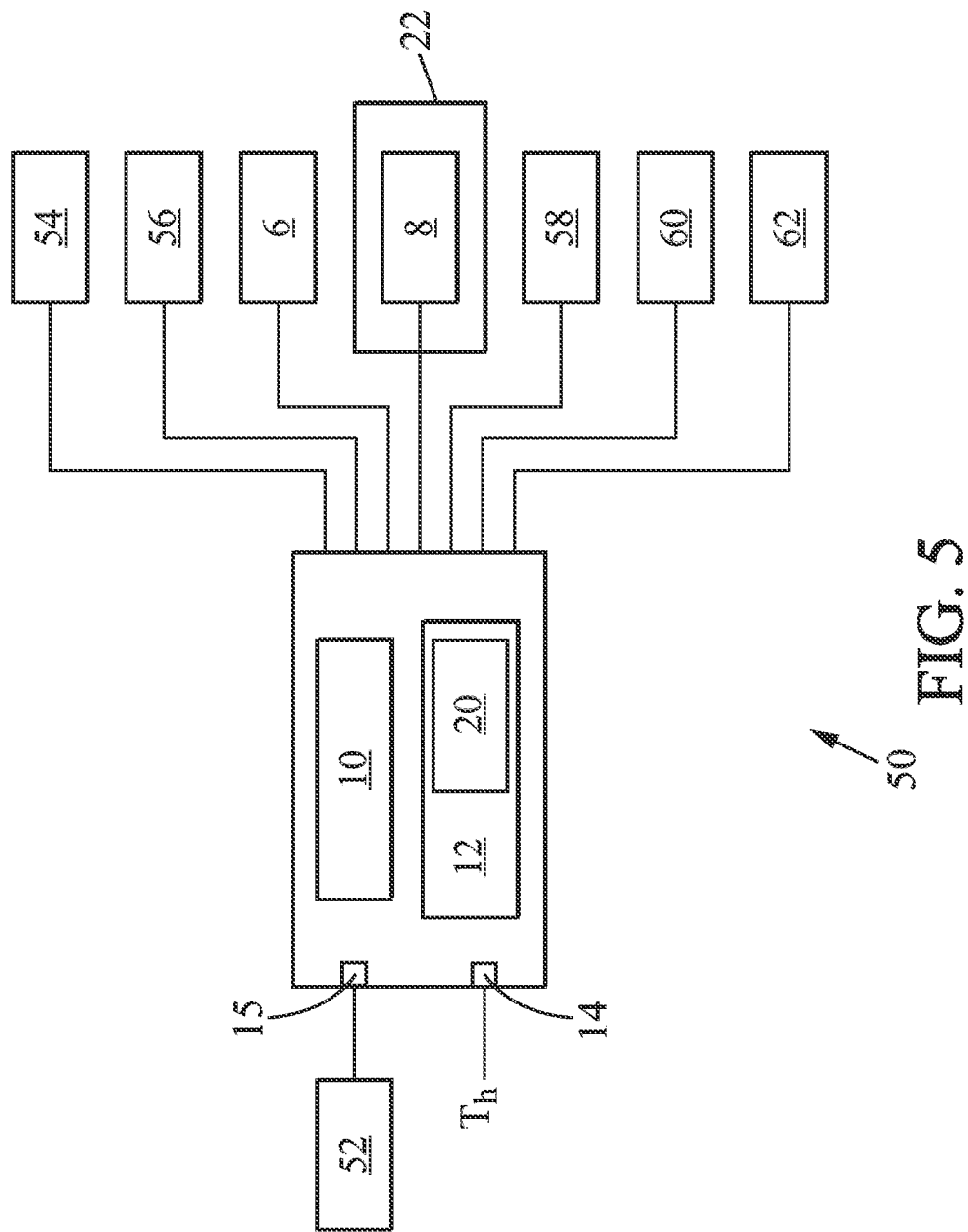
FIG. 5 is a schematic view of a regulation system according to a second embodiment of the invention.
Figure 6:
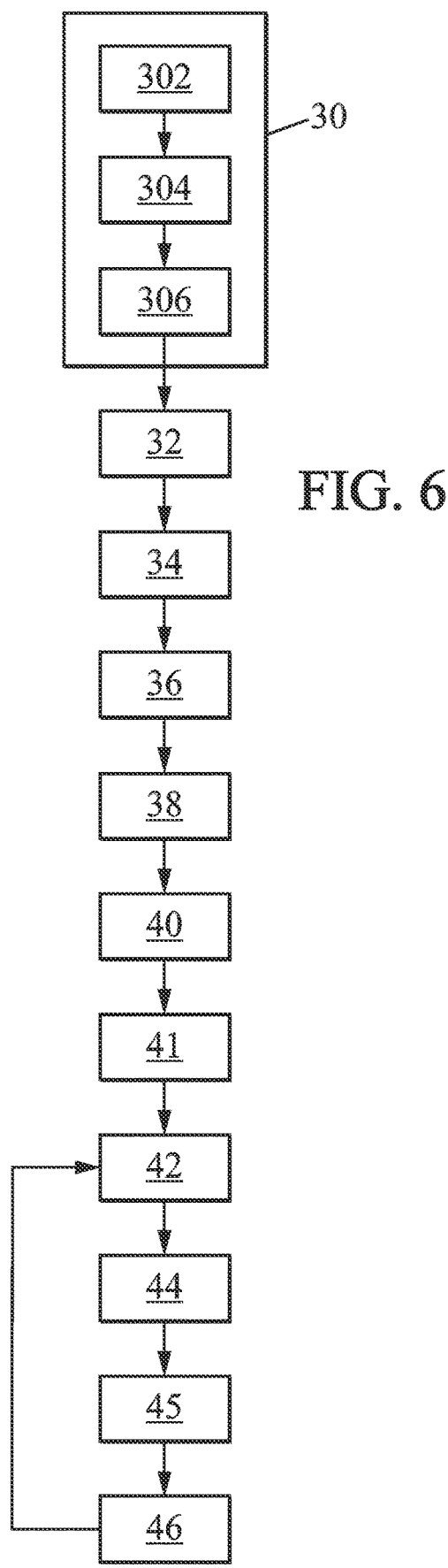
FIG. 6 is a diagram representing the steps of a method according to a second embodiment of the invention.

The regulation system 50 according to the second embodiment is illustrated in FIG. 5. It is similar to the regulation system according to the first embodiment. Identical elements bear the same references and will not be described again. In contrast to the regulation system illustrated in FIG. 2, it further comprises a human-machine interface 52, and possibly a ventilation system 54 for the seat and/or a heated steering wheel 56 and/or thermal glazing 58 and/or a passenger compartment heating system 60 and/or a passenger compartment ventilation system 62.

The human-machine interface 52 is connected to an input 15 of the controller 4. The ventilation system for the seat, the heated steering wheel, the thermal glazing, the passenger compartment heating system, and the passenger compartment ventilation system are connected to outputs of the processor.

The regulation method according to the second embodiment is implemented by the regulation system illustrated in FIG. 5.

The regulation method according to the second embodiment is similar to the regulation method illustrated in FIG. 4. The identical steps will not be described again. Only the differing steps are described below.

If the map 20 comprises several regulation values associated with the optimal comfort level N, the method further comprises a step 41 of selecting the regulation value which allows reducing the noise generated by the ventilation system for the seat.

During a step 44, a comfort adjustment instruction is received via the human-machine interface. This instruction is a "warmer" or "colder" type of instruction.

Upon receipt of this instruction, during a step 45 the processor modifies the optimal comfort level N to take into account the comfort adjustment instruction. For example, if the acquired instruction is "colder", the optimal comfort level between 0 and 0.7 is modified to be between, for example, −0.2 and 0.5.

Then, during a step 46, the regulation value(s) associated with the modified optimal comfort level are read in the map for each comfort device. Then the method continues by implementing the transmission step 42.

Figure 7:
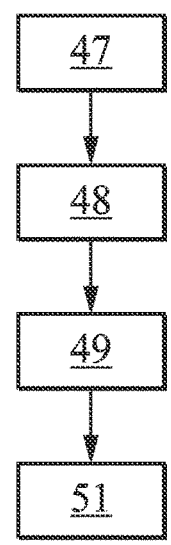
FIG. 7 is a diagram representing optional steps of the method according to the second embodiment of the invention.

Referring to FIG. 7, the method may further comprise a step 47 of receiving the identification of an occupant of a seat, for example by facial recognition based on a capture of the occupant's face or by retrieving this identification in an ECU-type of central unit of the vehicle.

This step 47 may be followed by a step 48 during which the identification of the occupant of the seat is stored, linked with the modified optimal comfort level N.

When, during a step 49, the processor receives an identification of an occupant identical to the occupant stored during step 48, the method uses during a step 51 the modified optimal comfort level N, for example stored during the last instruction from the user, in place of the optimal comfort level N. The map thus includes a comfort level that is personalized for the occupant of the seat. Consequently, the method for regulating thermal comfort according to the invention adapts to how heat is felt specifically by each person. It is thus possible to have a different comfort level depending on the users of the vehicle and a different comfort level for each occupant of the vehicle.

The invention claimed is:

1. A method for regulating comfort in a passenger compartment of a vehicle, the passenger compartment comprising at least one seat as well as comfort devices; the method being implemented by a controller comprising a memory containing a map, the controller being connected to said comfort devices; the comfort devices comprising at least one radiant panel and at least one heating device for the seat, the method comprising:
　establishing the map by experimentation in a preliminary characterization phase, the preliminary characterization phase comprising:
　　varying characteristic data items, which are characteristic of the state of the passenger compartment, and regulation values and measuring corresponding operating temperatures,
　　determining comfort indices as a function of the measured operating temperatures and storing in the map the comfort indices associated with each characteristic data item and with each regulation value of each device,
　　defining the optimal comfort level as a function of the comfort indices;
　acquiring at least one characteristic data item from among the characteristic data items, the at least one characteristic data item comprising the temperature of the passenger compartment;
　determining, from the map, an optimal comfort level as a function of the at least one characteristic data item;
　reading, in the map, regulation values associated with the optimal comfort level, said regulation values comprising values representative of the operating power of the comfort devices;
　transmitting the read regulation values to the comfort devices.

2. Method for regulating comfort according to claim 1, wherein the map comprises an optimal comfort level associated with at least one characteristic data item and with regulation values for the comfort devices.

3. Method for regulating comfort according to claim 1, wherein the acquisition step comprises the acquisition of several characteristic data items concerning the state of the passenger compartment, said characteristic data items comprising at least one data item among: a data item representative of the sunlight in the passenger compartment, a data item representative of the ventilation in the passenger compartment, a data item representative of the humidity in the passenger compartment, and a data item representative of the temperature of the seats.

4. Method for regulating comfort according to claim 1, wherein, when the map comprises several regulation values associated with the at least one characteristic data item and with an optimal comfort level for a comfort device, the method further comprises a step of selecting the regulation value which allows reducing the electrical consumption of said comfort device.

5. Method for regulating comfort according to claim 1, wherein the comfort devices further comprise at least one ventilation system for the seat, and wherein when the map comprises several regulation values associated with an optimal comfort level and with at least one characteristic data item, the method further comprising a step of selecting the regulation value which allows reducing the noise generated by the at least one ventilation system for the seat.

6. Method for regulating comfort according to claim 1, wherein the comfort index varies between −3 and +3, and wherein the comfort index is a function of the operating temperatures, for example according to the following relations:
　when the operating temperature is below 21° C., PMV=A×Top−B, where A is between 0.15 and 0.25 and B is between 3.15 and 4.25;
　when the operating temperature is between 21° C. and 27° C., the comfort index is between 0.5 and 1,
　when the operating temperature is above 27° C., PMV=A×Top−B, where A is between 0.3 and 0.4 and B is between 7.6 and 9.3;
　where PMV is the comfort index and Top is the measured operating temperature.

7. Method for regulating comfort according to claim 1, wherein the comfort indices are further determined based on the heat conductions of the at least one seat.

8. Method for regulating comfort according to claim 1, wherein the comfort index varies between −3 and +3, and wherein the comfort index is a function of the operating temperatures and of the heat transfer by conduction to which an occupant of the seat is subjected, for example according to the following relations:

when the operating temperature is below 21° C., PMV= $(A \times Top - B) + (0.303 \times e^{-0.036 \times M} + 0.028) \times cond$ where A is between 0.15 and 0.25 and B is between 3.15 and 4.25;

when the operating temperature is between 21° C. and 27° C., the comfort index is substantially equal to $0.7 + (0.303 \times e^{-0.036 \times M} + 0.028) \times cond$, when the operating temperature is above 27° C., PMV= $(A \times Top - B) + (0.303 \times e^{-0.036 \times M} + 0.028) \times cond$ where A is between 0.30 and 0.4 and B is between 7.6 and 9.3, where PMV is the comfort index, Top is the measured operating temperature, cond is the heat conduction of the seat, and M is the average metabolic rate of an occupant of the seat.

9. Method for regulating comfort according to claim 1, wherein the optimal comfort level is defined by a comfort index between 0 and 0.7.

10. Method for regulating comfort according to claim 9, wherein the comfort index is 0.

11. Method for regulating comfort according to claim 1, wherein the passenger compartment comprises a human-machine interface connected to the controller, the method further comprising the following steps:

receiving a comfort adjustment instruction via the human-machine interface, modifying the optimal comfort level according to the adjustment instruction received, reading, in the map, regulation values associated with the modified optimal comfort level and returning to the transmission step.

12. Method for regulating comfort according to claim 11, further comprising the following steps:

receiving the identification of an occupant of a seat, storing the identification of the occupant of the seat, linked to the modified optimal comfort level, and upon subsequently receiving an identification of the occupant of the seat corresponding to the stored identification, using the modified optimal comfort level.

13. Method for regulating comfort according to claim 1, wherein the passenger compartment comprises several seats and wherein the memory contains several maps, each map having been established by experimental measurements carried out for a seat.

14. System for regulating comfort in a passenger compartment of a vehicle, in particular of a motor vehicle, the system comprising comfort devices and a controller connected to the comfort devices, the controller comprising a memory containing a pre-established map; the comfort devices comprising at least one radiant panel and at least one heating device for a seat, the controller being configured to implement the method according to claim 1.

15. A non-transitory, computer-readable medium having stored thereon program code instructions that implement the method according to claim 1 when the program code instructions are executed by a processor.

* * * * *